May 5, 1970 H. L. ROSHAVEN 3,510,015

TAILGATE LOADING RAMP

Filed May 9, 1968 2 Sheets-Sheet 1

INVENTOR
HAROLD L. ROSHAVEN

BY Ross W. Campbell

ATTORNEYS

INVENTOR
HAROLD L. ROSHAVEN

United States Patent Office

3,510,015
Patented May 5, 1970

3,510,015
TAILGATE LOADING RAMP
Harold L. Roshaven, 324 Longfellow Blvd.,
Fenton, Mich. 33801
Filed May 9, 1968, Ser. No. 727,931
Int. Cl. B60p 1/64
U.S. Cl. 214—85                                          7 Claims

ABSTRACT OF THE DISCLOSURE

A detachable assembly for the tailgate of pickup trucks and the like for receiving loading ramps to facilitate the loading and unloading of such vehicles.

BACKGROUND OF THE INVENTION

Pickup trucks are commonly used to transport small vehicles such as garden tractors, riding mowers, snowmobiles, golf carts or the like from place to place and loading and unloading of these types of vehicles can be difficult. To aid in loading or unloading, ramps are often used but these have heretofore been makeshift and therefore not satisfactory or they have included members welded to and an integral part of the truck so that they have been quite expensive and incapable of use on other trucks or removal during non-use.

SUMMARY OF THE INVENTION

The present invention provides an assembly which can be readily attached to and detached from the tailgate of a pickup truck or the like without the need for welding, drilling or cutting. The assembly provides a means for mounting a pair of ramps to the truck when the tailgate is opened and the ramps can be used to load and unload the truck without danger of the ramps shifting during use.

DESCRIPTION OF THE DRAWINGS

A better understanding of the present invention will be obtained upon reference to the following description of several preferred embodiments thereof. The description makes reference to the accompanying drawings in which like reference characters refer to like parts throughout the several views and in which.

DESCRIPTION OF SEVERAL PREFERRED EMBODIMENTS

Figure 1:
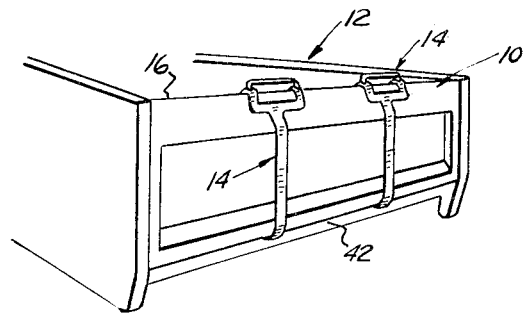
FIG. 1 is a perspective view illustrating the assembly of the present invention attached to a truck and ready for use.

Now referring to the drawings for a more detailed description of the invention one preferred assembly is illustrated in FIG. 1 as being attached to the tailgate 10 of a conventional pickup truck 12.

Figure 4:
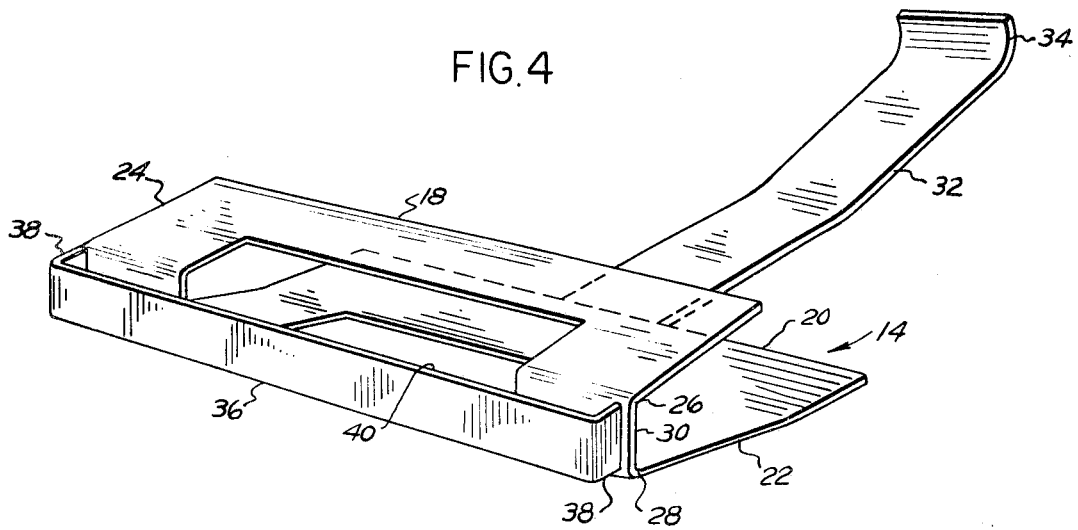
FIG. 4 is a perspective view of the support member shown in FIG. 2.

The assembly preferably comprises a pair of substantially identical support members 14 detachably mounted to and horizontally spaced along the outer or upper edge 16 of the tailgate 10. The support members 14 as can best be seen in FIG. 4 are each preferably of a substantially rectangular construction formed of metal end members 18 and 20 and similar side members 22 and 24 preferably joined together by welding. The side members 22 and 24 are each bent as at 26 and 28 along lines generally parallel to the end members 18 and 20 to form a medial section 30 and to bring the end members 18 and 20 into a substantially parallel relationship.

A relatively stiff strap 32 is welded or otherwise secured to the end member 20 and is provided at its free end with a return bent portion 34 extending generally upwardly in the direction of the end member 18. A strap 36 is spaced from the medial section 30 by side portions 38 welded or otherwise secured to the side members 22 and 24 and extends substantially parallel to the medial section 30 to provide a horizontal slot 40 therebetween.

Figure 2:
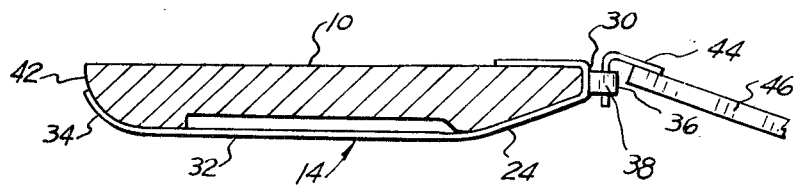
FIG. 2 is an enlarged cross-sectional view illustrating one of the supporting members of the present invention and the manner of attaching a ramp thereto.
Figure 3:
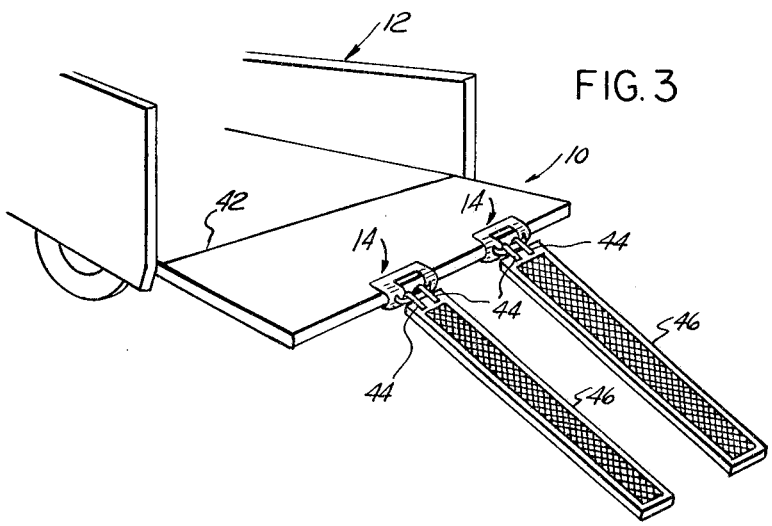
FIG. 3 is a perspective view illustrating the preferred assembly in use.

As can best be seen in FIGS. 1–3 the support members 14 are mounted to the tailgate 10 of the truck 12 by positioning the support members 14 over the edge 16 with a section of the tailgate clamped between the substantially parallel sections of the side members 22, 24 and the end members 18, 20. The support members 14 can be positioned so that the strap 32 is disposed on the outer or lower surface of the tailgate 10 as shown or the members 14 can also be positioned with the straps 32 disposed on the inner or upper surface of the tailgate 10. In either assembly the return bent portion 34 of the strap 32 is positioned to extend around the lower or hinge edge 42 of the tailgate 10 to aid in holding the support members 14 in place.

With the support members 14 attached to the tailgate 10 as described the slot 40 is disposed parallel and outwardly spaced from the upper or outer edge 16 of the tailgate 10. With the tailgate 10 in the open position as shown in FIGS. 2–3 the slot 40 is adapted to receive hooks 44 provided on the end of a ramp member 46. One ramp member 46 is attached in this manner to each of the support members 14 and extend to the ground. The ramp members 46 are spaced by the support members 14 to support the wheels of a vehicle to be loaded or unloaded from the truck and if necessary they can be readily adjusted to accommodate vehicles having different size wheel bases. The ramp members 46 can be of the expanded steel construction shown to provide a light yet strong construction having a gripping surface for the wheels of the vehicles being loaded or unloaded.

Figure 5:
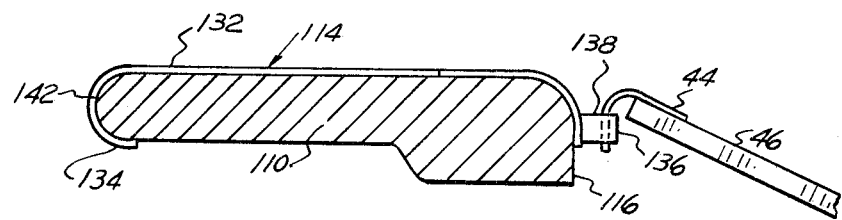
FIG. 5 is a cross-sectional view similar to FIG. 2 but illustrating another preferred embodiment thereof.
Figure 6:
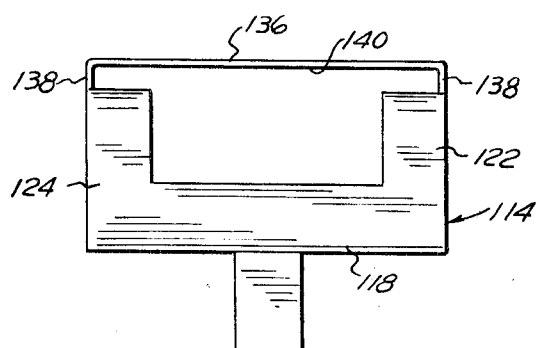
FIG. 6 is an elevational view of the support member shown in FIG. 5.

FIGS. 5 and 6 illustrate another preferred embodiment of the present invention which is better suited than the embodiment of FIGS. 1–4 for mounting to the tailgates of some types of trucks or vehicles. The support members 114 are similar to the support members 14 described above and are of a welded construction with an upper end member 118 and side members 122 and 124. A strap 136 is spaced from the lower ends of the side members 122 and 124 by bent portions 138 to define a slot 140 and the side members 122 and 124 are formed on a radius so that the strap 136 and upper end member 118 are disposed to extend in substantially perpendicular planes.

A strap 132 similar to the strap 32 is fixed to the end member 118 and is provided at its free end with a more pronounced return bent portion 134 than the corresponding portion of the strap 32.

The support members 114 are adapted to be attached to the tailgate 110 of a truck in the manner best illustrated in FIG. 5. Because of the particular construction of the tailgate 110 the modified support members 114 are intended to be mounted to the upper surface of the open tailgate 110 as shown. The return bent portions 134 of the straps 132 hook around the lower or hinge edge 142 of the tailgate 110 to perform more of the attaching function in this embodiment. The strap 132, end member 118 and the side members 122 and 124 rest on the upper surface of the tailgate 110 to perform a supporting function only and unlike the embodiment of FIGS. 1–4 there is no clamping attachment between the support members 114 and the upper or outer edge 116 of the tailgate 110.

Ramp members 46 provided with the hooks 44 are adapted to be received in the slots 140 formed intermediate the straps 136 and the side members 120 and 122 in the manner described above.

While the embodiments of the present invention have been described for the tailgate of a pickup truck it is obvious that they could be used with other vehicles such as station wagons or the like which have tailgates which do not open beyond a horizontal position.

The embodiment of FIGS. 1-4 has the advantage that it is more securely clamped in place than the embodiment of FIGS. 5-6. The construction of FIGS. 5 and 6 is more readily attached and detached than the embodiment of FIGS. 1-3 and is necessary for certain types of tailgate construction.

Having described two preferred embodiments of my invention, I claim:

1. A support assembly for detachably mounting a ramp member to the tailgate of a truck or the like, the tailgate being movable between a vertical position, whereby it forms a portion of a sidewall of the truck or the like, and a generally horizontal position, wherein it extends from the floor of the truck or the like, said support assembly comprising
    (a) at least one support member and means for mounting said support member to the upper edge of a tailgate of a truck or the like.
    (b) said support member having means defining a slot adjacent the upper edge of the tailgate, and
    (c) said ramp member having a hook portion at one end adapted to be received in said slot when the tailgate is in its horizontal position whereby said support member supports one end of said ramp member and the ramp and tailgate coact to form a runway to the floor of the truck or the like.

2. The assembly as defined in claim 1 and in which said mounting means includes a strap extending to the lower edge of said tailgate with said strap having a return bent portion extending around said lower edge.

3. The assembly as defined in claim 1 and in which said mounting means includes a clamping portion adapted to clamp over the upper edge of said tailgate.

4. The assembly as defined in claim 1 and including at least two support members with said support members being spaced along the upper edge of said tailgate and a ramp member mounted to each of said support members.

5. The assembly as defined in claim 1 and in which said support member comprises,
    (a) a rectangularly formed member having side members and at least one end member, and
    (b) said mounting means including said side members being contoured to the surface of said tailgate and a strap extending from said end member to the lower edge of said tailgate, said strap being provided with an end portion bent to extend around said lower edge.

6. The assembly as defined in claim 5 and in which the means defining said slot comprises a strap secured to said side members and extending therebetween.

7. The assembly as defined in claim 1 and in which said support member comprises,
    (a) a rectangularly formed member having side members and end members, and
    (b) said mounting means including said side members being bent to bring said end members into a substantially parallel relationship to thereby provide a clamp therebetween for receiving the upper edge of the tailgate and a strap extending from one of said end members to the lower edge of said tailgate, said strap being provided with an end portion bent to extend around said lower edge.

References Cited
UNITED STATES PATENTS

| | | | |
|---|---|---|---|
| 565,898 | 8/1896 | Holmes | 214—85 XR |
| 2,705,081 | 3/1955 | Jacobs | 214—85 |

ALBERT J. MAKAY, Primary Examiner

U.S. Cl. X.R.

296—61